(12) United States Patent
Muguruma et al.

(10) Patent No.: US 8,137,225 B2
(45) Date of Patent: Mar. 20, 2012

(54) CHAIN TENSIONER DEVICE

(75) Inventors: Naoko Muguruma, Wako (JP); Shinji Yamada, Wako (JP); Yuji Matsumochi, Wako (JP); Yuuji Fujimoto, Wako (JP); Yojiro Koiwa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 379 days.

(21) Appl. No.: 12/413,169

(22) Filed: Mar. 27, 2009

(65) Prior Publication Data

US 2009/0258737 A1 Oct. 15, 2009

(30) Foreign Application Priority Data

Apr. 14, 2008 (JP) ................................. 2008-104406
Jan. 22, 2009 (JP) ................................. 2009-011669

(51) Int. Cl.
*F16H 7/08* (2006.01)
(52) U.S. Cl. ...................................................... 474/111
(58) Field of Classification Search .................. 474/111, 474/110, 140, 101
See application file for complete search history.

(56) References Cited

U.S. PATENT DOCUMENTS

| | | | |
|---|---|---|---|
| 7,018,312 B2* | 3/2006 | Sonobata | 474/111 |
| 7,074,146 B2* | 7/2006 | Fujikubo et al. | 474/111 |
| 7,942,770 B2* | 5/2011 | Komorowski et al. | 474/110 |
| 2004/0106484 A1* | 6/2004 | Sonobata | 474/111 |
| 2004/0132569 A1* | 7/2004 | Fujikubo et al. | 474/111 |

FOREIGN PATENT DOCUMENTS

| | | | |
|---|---|---|---|
| JP | 57-202039 B | | 12/1982 |
| JP | 57-202039 U | | 12/1982 |
| JP | 60-86665 U | | 6/1985 |
| JP | 09-203442 A | | 8/1997 |
| JP | 2004-100886 A | | 4/2004 |
| JP | 2009275911 A | * | 11/2009 |
| JP | 2010242980 A | * | 10/2010 |
| JP | 2010249193 A | * | 11/2010 |
| JP | 2011080588 A | * | 4/2011 |
| WO | WO 2006015483 A1 | * | 2/2006 |

* cited by examiner

*Primary Examiner* — Michael Mansen
*Assistant Examiner* — Juan Campos, Jr.
(74) *Attorney, Agent, or Firm* — Arent Fox LLP

(57) ABSTRACT

A chain tensioner device having a first slide surface of a main arm pivotably supported at an upper end thereof, and a second slide surface of a sub-arm pivotably supported at a lower end thereof. The first and second slide surfaces slidably abut against each other. When the main arm is biased toward a timing chain via the sub-arm by a biasing force of a plunger of a tensioner lifter, a stroke of the main arm is increased with respect to a stroke of the plunger.

5 Claims, 5 Drawing Sheets

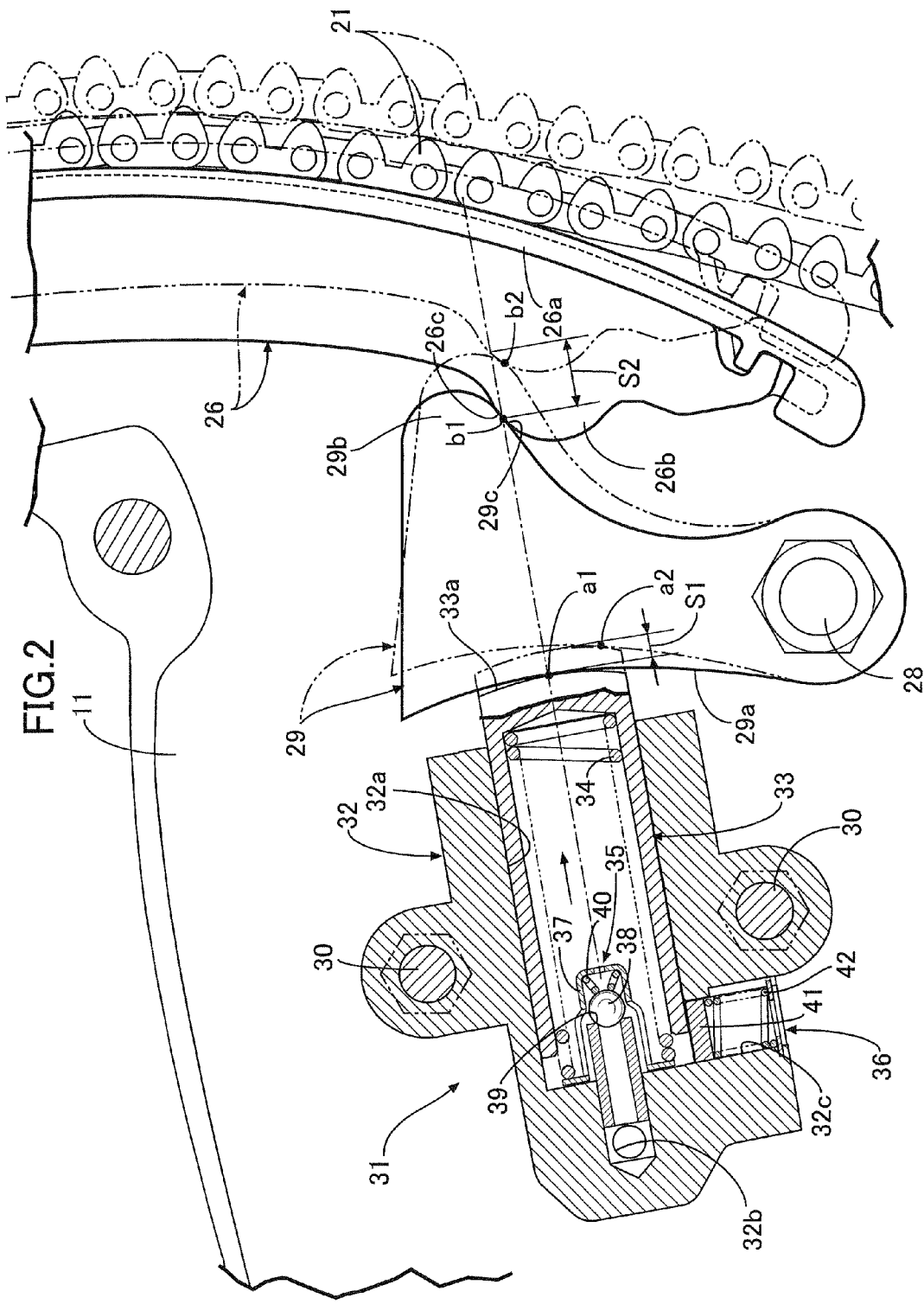

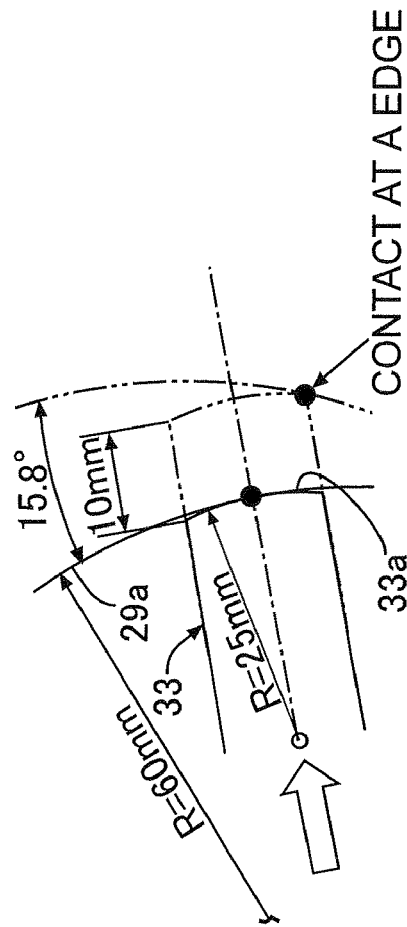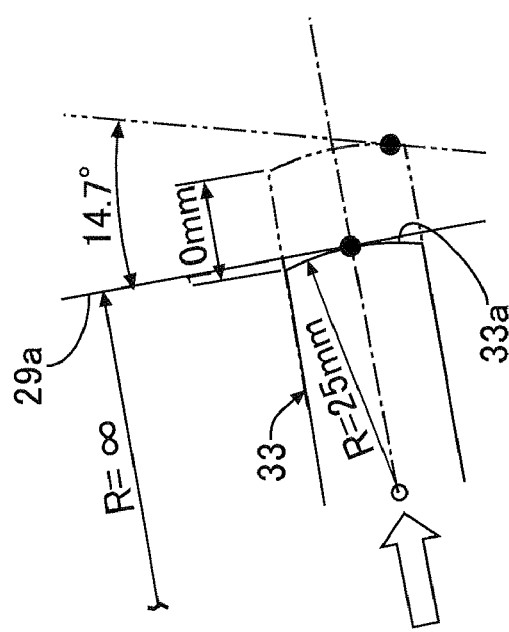
FIG.3A
FIG.3B

CHAIN TENSIONER DEVICE

CROSS-REFERENCE TO RELATED APPLICATIONS

This application is based upon and claims the benefit of priority from the prior Japanese Patent Application Nos. 2008-104406 and 2009-011669, filed Apr. 14, 2008 and Jan. 22, 2009, respectively, the entire contents of which are incorporated herein by reference.

BACKGROUND OF THE INVENTION

1. Field of the Invention

The present invention relates to a chain tensioner device having a main arm pivotably supported by a first support shaft and brought into slide contact with an endless chain to apply a predetermined tension to the endless chain. The endless chain is wrapped around a drive sprocket provided on a driving shaft and a follower sprocket provided on a follower shaft. A tensioner lifter generates a biasing force to bias the main arm toward the endless chain. A sub-arm is pivotably supported by a second support shaft and transfers the biasing force of the tensioner lifter to the main arm.

2. Description of the Related Art

Japanese Patent Application Laid-open No. 2004-100886 discloses a device having a flexible tensioner arm that abuts against a loose side of a timing chain which transfers rotation of a crankshaft of an engine to a camshaft. The device further has a control arm provided between a plunger of a hydraulic tensioner lifter and the tensioner arm. The control arm prevents any oscillation of the flexible tensioner arm from being transmitted to the tensioner lifter to increase extension and contraction response as well as improve the durability of the tensioner lifter.

The plunger is configured to be biased in a protruding direction by hydraulic pressure and a biasing force of a spring. When biased, the plunger extends and presses the tensioner arm against the timing chain, and then receives a reaction force from the timing chain that causes the plunger to retract in a direction opposite to the protruding direction. Thus, there is a problem wherein an increase in the plunger stroke reduces extension and contraction response, and wherein the extension and contraction of the plunger cannot follow or correspond to changes in the tension of the timing chain during short intervals. To increase the extension and contraction response of the plunger, the stroke of the plunger needs to be reduced, but reducing the stroke of the plunger more than necessary is undesirable for ensuring a required stroke of the tensioner arm.

SUMMARY OF THE INVENTION

The present invention is achieved in view of the above described circumstances, and an aspect of the invention is to ensure a stroke of a tensioner arm of a chain tensioner device and reduce a stroke of a plunger of a tensioner lifter to increase the extension and contraction response of the plunger.

In order to at least achieve the aspect, according to a first feature of the present invention, there is provided a chain tensioner device including a main arm that is pivotably supported by a first support shaft and brought into slide contact with an endless chain, thereby applying a predetermined tension to the endless chain. The endless chain is wrapped around a drive sprocket provided on a driving shaft and a follower sprocket provided on a follower shaft. A tensioner lifter generates a biasing force which biases the main arm toward the endless chain. A sub-arm is pivotably supported by a second support shaft and transfers the biasing force of the tensioner lifter to the main arm, wherein a first slide surface provided on the main arm and a second slide surface provided on the sub-arm slidably abut against each other to enhance or increase a stroke of the tensioner lifter and transfer the stroke to the main arm.

With the above described structural configuration, the first slide surface of the main arm that is pivotably supported by the first support shaft, and the second slide surface of the sub-arm that is pivotably supported by the second support shaft slidably abut against each other. As such, when the main arm is biased by the biasing force of the tensioner lifter via the sub-arm toward the endless chain, the stroke of the tensioner lifter is enhanced or increased and transferred to the main arm. Thus, even with relatively large or substantial changes in the tension of the endless chain, the tensioner lifter can merely generate a small stroke that causes the main arm to follow the endless chain with high response to provide or maintain stable tension of the endless chain, thereby increasing the power transmission performance and durability of the tensioner lifter.

According to a second feature of the present invention, in addition to the first feature, the first slide surface of the main arm abuts against the second slide surface of the sub-arm from the side of the second support shaft of the sub-arm.

With the above described structural configuration, the stroke of the tensioner lifter is enhanced or increased and transferred to the main arm by using a relatively simple structural arrangement.

According to a third feature of the present invention, in addition to the first or second feature, the main arm has the first support shaft at one end and the first slide surface at the other end.

With the above described structural configuration, a load applied from the endless chain to the main arm is transferred from the sub-arm to the tensioner lifter without being increased, thereby reducing the load applied to the tensioner lifter and reducing the size of the tensioner lifter.

According to a fourth feature of the present invention, in addition to any of the first to third features, a curvature of a tip end portion of a plunger of the tensioner lifter is larger than a curvature of a back surface of the sub-arm against which the tip end portion abuts.

With the above described structural configuration, an edge of the tip end portion of the plunger is prevented from contacting the back surface of the sub-arm, and ensures a sufficient pivot angle of the sub-arm with respect to the stroke of the plunger.

In the embodiments disclosed herein, it should be noted that the crankshaft corresponds to a driving shaft of the present invention; the intake camshaft and exhaust camshaft correspond to a follower shaft of the present invention; and the timing chain corresponds to an endless chain of the present invention.

The above described structural configuration, other aspects, characteristics and advantages of the present invention will be clear from the following detailed descriptions, which will be provided below in conjunction with the attached drawings.

BRIEF DESCRIPTION OF THE DRAWINGS

FIG. 2 is an enlarged view of essential portions in FIG. 1;

FIGS. 3A and 3B show states of contact between a tip end portion of a plunger and a back surface of a sub-arm;

DESCRIPTION OF THE PREFERRED EMBODIMENTS

A first embodiment of the present invention will be explained below in conjunction with FIGS. 1 to 3B.

Figure 1:
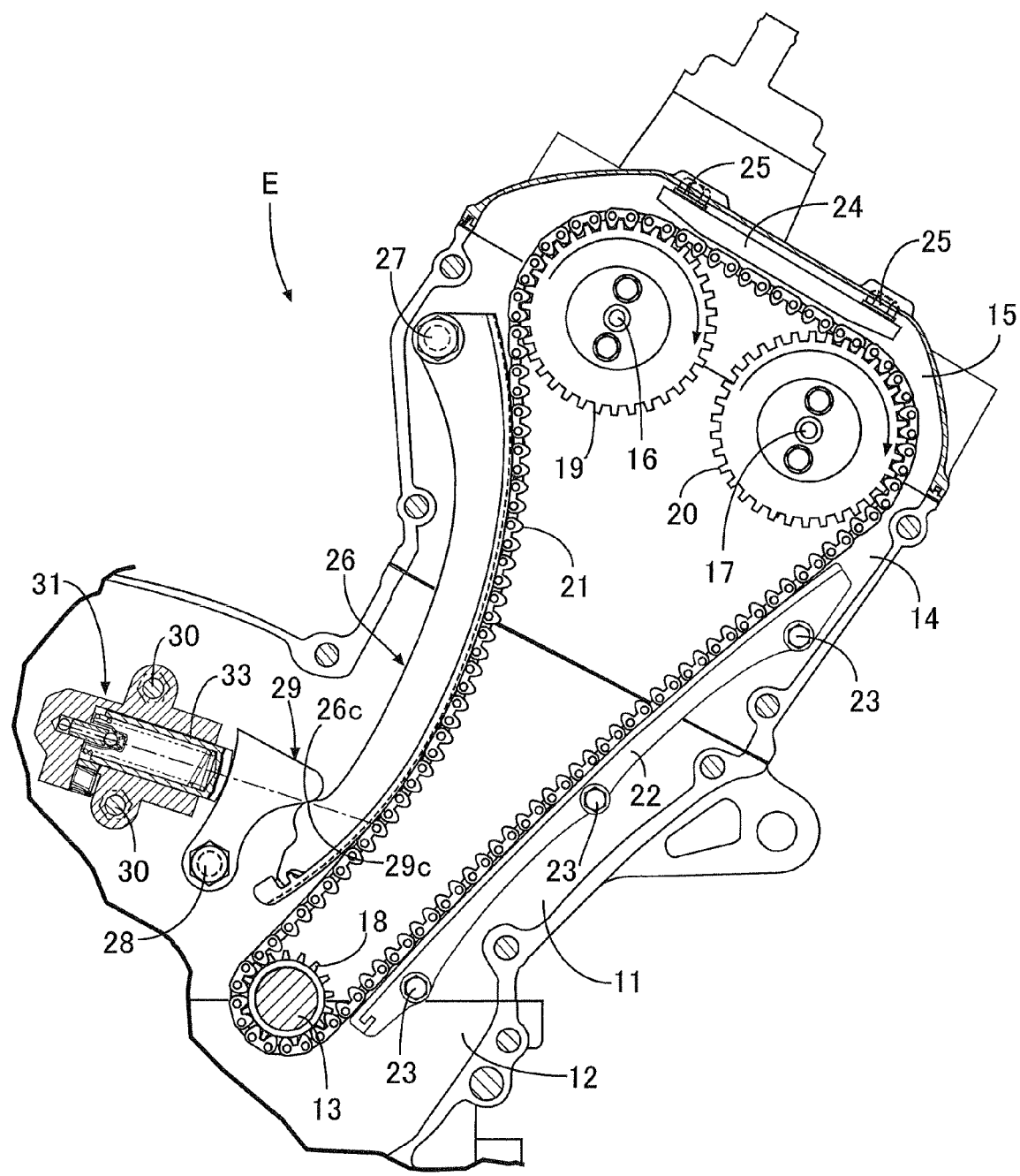
FIG. 1 is a partial front view of a first embodiment of the present invention.

As shown in FIG. 1, a crankshaft 13 is rotatably supported between a cylinder block 11 of an engine E and a crankcase 12 connected to a lower surface of the cylinder block 11. An intake camshaft 16 and an exhaust camshaft 17 are rotatably supported between a cylinder head 14 connected to an upper surface of the cylinder block 11 and a head cover 15 connected to an upper surface of the cylinder head 14. A timing chain 21 formed by an endless chain is wrapped around a drive sprocket 18 and two follower sprockets 19 and 20. The drive sprocket 18 is provided on an end of the crankshaft 13 and the follower sprockets 19 and 20 are provided on ends of the intake camshaft 16 and the exhaust camshaft 17, respectively. The intake camshaft 16 and the exhaust camshaft 17 are driven at a rotational speed that is half of the rotational speed of the crankshaft 13.

A first fixed chain guide 22 brought into slide contact with a chord on a tension side of the timing chain 21 located between the drive sprocket 18 and the follower sprocket 20 of the exhaust camshaft 17 is secured by a plurality of bolts 23 and spans the cylinder block 11 and the cylinder head 14. A second fixed chain guide 24 brought into slide contact with a chord of the timing chain 21 located between the two follower sprockets 19 and 20 of the intake camshaft 16 and the exhaust camshaft 17 is secured on the head cover 15 by a plurality of bolts 25.

A main arm 26 brought into slide contact with a chord on a loose side of the timing chain 21 located between the drive sprocket 18 and the follower sprocket 19 of the intake camshaft 16 is pivotably supported, at an upper end, on the cylinder head 14 by a first support shaft 27. A sub-arm 29 is pivotably supported, at a lower end, on the cylinder block 11 by a second support shaft 28. A hydraulic tensioner lifter 31 secured to the cylinder block 11 by two bolts 30 and 30 presses the main arm 26 against the timing chain 21 via the sub-arm 29 to apply predetermined tension to prevent looseness.

As is apparent from FIG. 2, the tensioner lifter 31 includes a tensioner housing 32 secured to the cylinder block 11 by the bolts 30 and 30, a plunger 33 slidably fitted in a cylinder 32a formed in the tensioner housing 32, a coil spring 34 that biases the plunger 33 in a direction to protrude from the cylinder 32a, a check valve 35 that supplies hydraulic oil to the cylinder 32a, and a relief valve 36 that discharges the hydraulic oil from the cylinder 32a. A biasing force generated by the plunger 33 is increased or reduced by adjusting the hydraulic pressure of the hydraulic oil or a resilient force of the coil spring 34.

The check valve 35 includes a check ball 38 housed in a valve housing 37, and a valve spring 40 that biases the check ball 38 in a direction to be seated on a valve seat 39. Hydraulic oil supplied from an oil pump (not shown) is supplied to a back portion of the valve seat 39 through an oil passage 32b formed in the tensioner housing 32. The relief valve 36 includes a valve body 41 placed in an opening 32c passing through the tensioner housing 32, and a valve spring 42 that biases the valve body 41 in a valve closing direction.

A partially spherical tip end portion 33a of the plunger 33 of the tensioner lifter 31 abuts against an arcuate back surface 29a of the sub-arm 29. A curvature of the tip end portion 33a of the plunger 33 is larger than a curvature of the back surface 29a of the sub-arm 29. Thus, the tip end portion 33a of the plunger 33 and the back surface 29a of the sub-arm 29 are brought into point contact with each other.

The main arm 26, which may be made of synthetic resin, has, on one side surface, a liner 26a which may be made of synthetic resin and which is brought into slide contact with the timing chain 21, and has, on the other side surface, a first bump 26b at a farthest position from the first support shaft 27. The sub-arm 29, which may also be made of synthetic resin, has a second bump 29b on the side opposite from the back surface 29a and at a farthest position from the second support shaft 28. A first slide surface 26c on an upper side of the first bump 26b of the main arm 26 and a second slide surface 29c on a lower side of the second bump 29b of the sub-arm 29 are brought into slide contact with each other. At this time, the first slide surface 26c of the main arm 26 is located on a side closer to the first support shaft 27 than the bump 26b, and the second slide surface 29c of the sub-arm 29 is located on a side closer to the second support shaft 28 than the bump 29b.

Next, operation of the present invention having the above-mentioned structural arrangement will now be explained.

When the timing chain 21 wrapped around the drive sprocket 18 and the two follower sprockets 19 and 20 is rotated with operation of the engine E, changes in the tension of the timing chain 21, which may be caused by changes in the rotational speed of the crankshaft 13 or the like, may reduce power transmission performance or durability of the timing chain 21.

To prevent such from occurring, when the tension of the chord on the loose side of the timing chain 21 located between the drive sprocket 18 and the follower sprocket 19 is reduced to decrease contact surface pressure between the main arm 26 and the timing chain 21, the plunger 33 is moved in a protruding direction from the cylinder 32a by the resilient force of the coil spring 34. Thus, the high pressure hydraulic oil supplied from the oil passage 32b of the tensioner lifter 31 pushes open the check ball 38 of the check valve 35 and flows into the cylinder 32a. As a result, with the back surface 29a being pressed by the plunger 33, the sub-arm 29 pivots clockwise around the second support shaft 28, the second slide surface 29c presses the first slide surface 26c of the main arm 26, and the main arm 26 pivots counterclockwise around the first support shaft 27 to press the chord on the loose side of the timing chain 21 to increase tension.

On the other hand, when the tension of the chord on the loose side of the timing chain 21 located between the drive sprocket 18 and the follower sprocket 19 is increased, a load transferred from the timing chain 21 via the main arm 26 and the sub-arm 29 compresses the plunger 33 to increase the internal pressure of the cylinder 32a. Thus, the check valve 35 is closed and the relief valve 36 is opened, and the plunger 33 retracts into the cylinder 32a and compresses the coil spring 34.

At the start of the stroke, the tip end portion 33a of the plunger 33 and the back surface 29b of the sub-arm 29 abut against each other at a point a1, and the second slide surface 29c of the sub-arm 29 and the first slide surface 26c of the main arm 26 abut against each other at a point b1. At the finish of the stroke, the point a1 and the point b1 move to a point a2 and a point b2, respectively.

As such, the plunger 33 protrudes or extends from and retracts or contracts into the tensioner housing 32 with the increase and decrease in the tension of the timing chain 21 to maintain the stable tension state of the timing chain 21, as well as increasing the power transmission performance and durability of the endless chain 21.

There is a possibility that if the extension and contraction stroke of the plunger 33 is relatively large, the extension and contraction of the plunger 33 cannot follow the abrupt increase and decrease in the tension of the timing chain 21, wherein the tensioner lifter 31 cannot prevent the tension of the timing chain 21 from undesirably changing. However, according to the present invention, a small extension and contraction stroke of the plunger 33 is enhanced or increased and transferred to the main arm 26, and thus the stroke of the plunger 33 is smaller than a required stroke of the main arm 26 to cause the extension and contraction of the plunger 33 to follow any abrupt increase and decrease in the tension of the timing chain 21.

Specifically, as is apparent from FIG. 2, the second slide surface 29c of the sub-arm 29 and the first slide surface 26c of the main arm 26 slidably abut against each other. Thus, when the plunger 33 advances by a stroke S1 from a state shown by a solid line to a state shown in a chain line, a lower end of the main arm advances by a stroke S2 that is larger than the stroke S1 to enhance or increase the extension and contraction stroke of the plunger 33 and transfer the stroke to the main arm 26.

The first slide surface 26c of the main arm 26 is provided at the farthest position from the first support shaft 27. Thus, the load applied from the timing chain 21 to the main arm 26 is transferred from the sub-arm 29 to the tensioner lifter 31 without being increased, thereby reducing the load applied to the tensioner lifter 31 and the size of the tensioner lifter 31.

FIG. 3A shows a case where a radius of the tip end portion 33a of the plunger 33 is 25 mm and a radius of the back surface 29a of the sub-arm 29 is infinite (linear). In this case, for a 10 mm stroke of the plunger 33, the sub-arm 29 pivots 14.7°.

FIG. 3B shows a case where the radius of the tip end portion 33a of the plunger 33 is 25 mm and a radius of the back surface 29a of the sub-arm 29 is 60 mm. In this case, for a 10 mm stroke of the plunger 33, the sub-arm 29 pivots 15.8°.

As such, the pivot angle of the sub-arm 29 can be increased to increase the stroke of the main arm 26 with the decrease of the radius of the back surface 29a of the sub-arm 29. However, if the radius of the back surface 29a is reduced excessively, an edge of the tip end portion 33a may be brought into contact with the back surface 29a of the sub-arm 29 to cause galling at the end stage of the stroke of the plunger 33 (see FIG. 3B). Thus, the radius of the back surface 29a of the sub-arm 29 should preferably be reduced within a range that does not cause galling.

Figure 4:
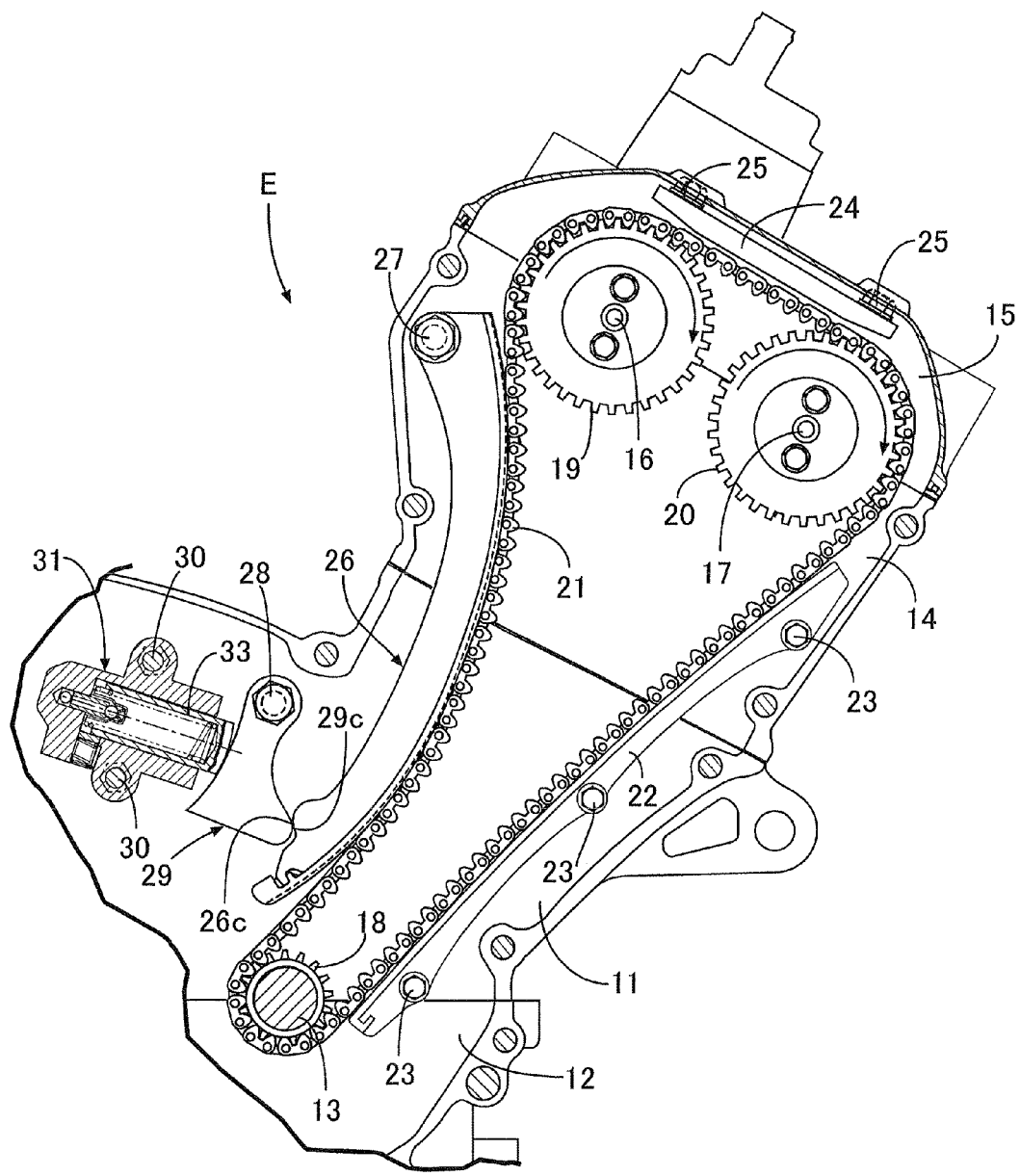
FIG. 4 is a partial front view with a chain cover of an engine being removed according to a second embodiment.

Next, a second embodiment of the present invention will be explained in conjunction with FIG. 4.

The second embodiment differs from the first embodiment in that the second support shaft 28 is provided at an upper end of a sub-arm 29, instead of at the lower end of the sub-arm 29 as in the first embodiment. A first slide surface 26c provided on a lower side of a bump 26b of a main arm 26 slidably abuts against a second slide surface 29c provided on an upper side of a bump 29b of the sub-arm 29. As in the first embodiment, the first slide surface 26c of the main arm 26 abuts against the second slide surface 29c of the sub-arm 29 on the side of the second support shaft 28 of the sub-arm 29.

Also, the stroke of a lower end of the main arm 26 can be larger than the stroke of the plunger 33 to obtain the same operation and effect as in the first embodiment.

Figure 5:
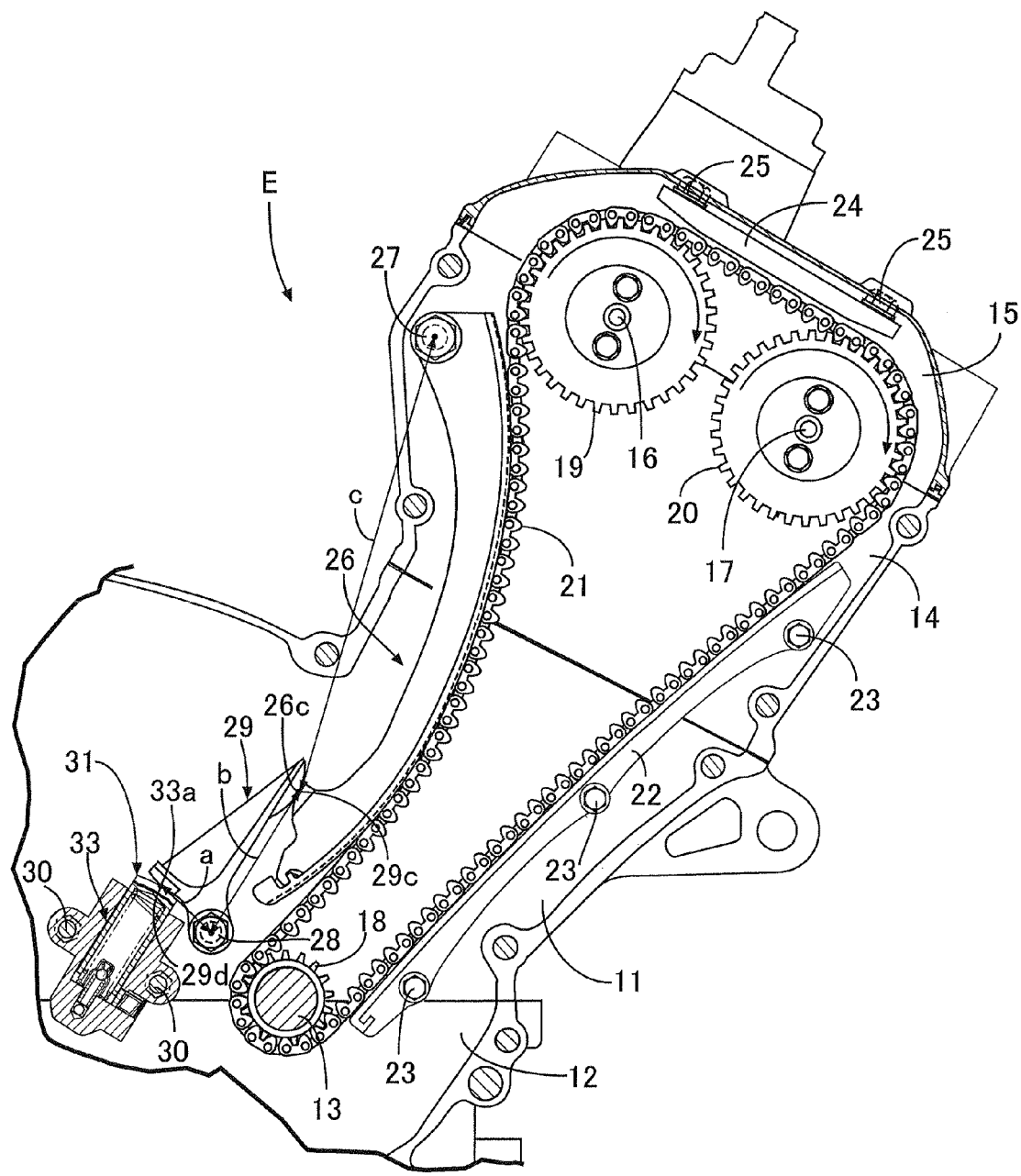
FIG. 5 is a partial front view with a chain cover of an engine being removed according to a third embodiment.

Next, a third embodiment of the present invention will be explained in conjunction with FIG. 5.

In the first and second embodiments, the tensioner lifter 31 is positioned so as to significantly or greatly cross a cylinder axis, while in the third embodiment, the tensioner lifter 31 is positioned to be substantially in parallel with the cylinder axis. The sub-arm 29 is L-shaped and has a bent portion pivoted on the cylinder block 11 by a second support shaft 28, an abutment portion 29d at a tip end of a short side abuts against a tip end portion 33a of the plunger 33, and a second slide surface 29c at a tip end of a long side abuts against a first slide surface 26c at a lower end of a main arm 26. The short side of the sub-arm 29 is positioned to substantially be orthogonal relative to the cylinder axis, and the long side of the sub-arm 29 is positioned to substantially be in parallel with the cylinder axis.

A length b of the long side is preferably twice or more a length a of the short side of the sub-arm 29, and a length c from the first support shaft 27 of the main arm 26 to the first slide surface 26c is preferably twice or more, or about three times the length b of the long side of the sub-arm 29. The main arm 26 is preferably made of synthetic resin, while the sub-arm 29 is made of aluminum, thereby increasing seizure resistance.

In the third embodiment, the principle of enhancing or increasing the extension and contraction stroke of the plunger 33, and transferring the stroke to the main arm 26 is different from the principle in the first and second embodiments. Specifically, the length b of the long side is twice or more the length a of the short side of the sub-arm 29, and thus the extension and contraction stroke of the plunger 33 can be enhanced or increased b/a times and transferred to the main arm 26, and the tension of the timing chain 21 is properly maintained even if the timing chain 21 is stretched due to deterioration.

Further, enhancing or increasing the stroke can reduce the size of the tensioner lifter 31, and even in the case of the main arm 26, having a relatively large oscillation, the amplitude is reduced a/b times and transferred to the plunger 33, thereby minimizing the extension and contraction of the plunger 33 to increase followability of the tensioner lifter 31. The length c from the first support shaft 27 of the main arm 26 to the first slide surface 26c is twice or more, or about three times the length b of the long side of the sub-arm 29, thereby allowing the main arm 26 to be biased with a sufficient load without increasing the size of the tensioner lifter 31.

The tensioner lifter 31 is positioned to be substantially parallel relative to the cylinder axis, and the plunger 33 protrudes upward, thereby minimizing the amount of hydraulic oil in the tensioner lifter 31 leaking outside through a gap between the tensioner lifter 31 and an outer peripheral surface of the plunger 33, even if the mounting position of the engine E is changed. Further, the tensioner lifter 31 does not overhang orthogonally relative to the cylinder axis, thereby minimizing the overall width of the cylinder block 11.

In the above described embodiment, the tensioner lifter 31 is provided on the cylinder block 11, but may be provided to span the crankcase 12 or a lower block connected to the lower side of the cylinder block 11.

Although preferred embodiments of the present invention are explained above, the present invention is not limited to such and may be modified in a variety of ways as long as the modifications do not depart from the spirit and scope of the present invention.

For example, the tensioner lifter 31 is described as being a hydraulic tensioner lifter, but it is within the spirit and scope of the present invention to use a mechanical tensioner lifter that biases a plunger by using a spring and without using hydraulic pressure.

Although the invention is described as having two follower sprockets 19 and 20, it is within the spirit and scope of the present invention to use one follower sprocket.

The main arm 26 need not be a rigid body, but may be a so-called blade tensioner having a leaf spring.

While the main arm 26 is described above as being made from synthetic resin, it is within the scope of the invention for the main arm 26 to be made of metal. In this case, the main arm 26 and the sub-arm 29 are made of different materials, thereby increasing sliding performance.

What is claimed is:

1. A chain tensioner device comprising:
   an endless chain;
   a main arm pivotably supported by a first support shaft and brought into slide contact with the endless chain to apply a predetermined tension to the endless chain, the endless chain being wrapped around a drive sprocket provided on a driving shaft and a follower sprocket provided on a follower shaft;
   a tensioner lifter that generates a biasing force for biasing the main arm toward the endless chain; and
   a sub-arm pivotably supported by a second support shaft, the sub-arm transferring the biasing force of the tensioner lifter to the main arm,
   wherein a first slide surface provided on the main arm and a second slide surface provided on the sub-arm slidably abut against each other to increase a stroke of the tensioner lifter and transfer the stroke to the main arm,
   wherein the main arm has a first bump and the sub-arm has a second bump, the first slide surface being defined along the first bump and the second slide surface being defined along the second bump, and
   wherein the first slide surface of the main arm abuts against the second slide surface of the sub-arm from a side of the second support shaft.

2. The chain tensioner device according to claim 1, wherein the main arm has the first support shaft at one end and the first slide surface at the other end.

3. The chain tensioner device according to claim 2, wherein a curvature of a tip end portion of a plunger of the tensioner lifter is larger than a curvature of a back surface of the sub-arm against which the tip end portion abuts.

4. The chain tensioner device according to claim 1, wherein a curvature of a tip end portion of a plunger of the tensioner lifter is larger than a curvature of a back surface of the sub-arm against which the tip end portion abuts.

5. The chain tensioner device according to claim 2, wherein the first slide surface is defined on a side of the first bump closer to the first support shaft and the second slide surface is defined on a side of the second bump closer to the second support shaft.

* * * * *